(12) United States Patent
Scholz et al.

(10) Patent No.: US 6,536,288 B2
(45) Date of Patent: Mar. 25, 2003

(54) DIFFERENTIAL PRESSURE SENSOR

(75) Inventors: Wolfgang Scholz, Minden (DE); Albrecht Vogel, Stutensee (DE); Peter Krippner, Karlsruhe (DE); Dieter Binz, Hirschberg (DE)

(73) Assignee: ABB Patent GmbH, Mannheim (DE)

( * ) Notice: Subject to any disclaimer, the term of this patent is extended or adjusted under 35 U.S.C. 154(b) by 0 days.

(21) Appl. No.: 10/172,132

(22) Filed: Jun. 14, 2002

(65) Prior Publication Data

US 2002/0194920 A1 Dec. 26, 2002

(30) Foreign Application Priority Data

Jun. 23, 2001 (DE) .......................... 101 30 372

(51) Int. Cl.$^7$ ................................ G01L 9/12
(52) U.S. Cl. ........................................ 73/718
(58) Field of Search .................. 73/718, 724, 715, 73/716, 722, 723; 361/283.1, 283.2, 283.3, 283.4; 156/272.2, 273.1

(56) References Cited

U.S. PATENT DOCUMENTS 5,207,103 A  *  5/1993 Wise et al. ............... 73/724
5,695,590 A  *  12/1997 Willcox et al. .......... 156/272.2
5,804,736 A  *  9/1998 Klauder et al. ............ 73/724

* cited by examiner

*Primary Examiner*—William Oen
(74) *Attorney, Agent, or Firm*—Michael M. Rickin, Esq.

(57) ABSTRACT

There is described a differential pressure sensor made using glass-silicon technology with a diaphragm plate arranged between two carrier plates. To achieve a high resolution at the beginning of the measuring range in conjunction with high overload resistance, the measuring diaphragm plate of the sensor has for a prescribed measuring range within the same measuring chambers a plurality of mutually independent deflectable regions as measuring diaphragms. Each such region acts as a part-sensor with a part-measuring range. The part-measuring ranges of the part-sensors overlap and in total are equal to the prescribed measuring range of the differential pressure sensor. The displacement of the measuring diaphragm of each part-sensor is mechanically limited outside its part-measuring range by the carrier plates.

28 Claims, 4 Drawing Sheets

DIFFERENTIAL PRESSURE SENSOR

FIELD OF THE INVENTION

The invention relates to a differential pressure sensor made using glass-silicon technology with a high overload resistance for industrial applications.

DESCRIPTION OF THE PRIOR ART

For measuring differential pressures, usually piezoresistive or capacitive pressure sensors are used. A common characteristic of both is that a diaphragm is deformed pressure-dependently. The degree of deformation is in this case a measure of the pressure.

Piezoresistive pressure sensors are distinguished by high long-term stability, a wide operating temperature range and a large measuring range in conjunction with low temperature dependence and high measurement dynamics. However, particularly in the case of high pressures or differential pressures, piezoresistive pressure sensors have an unsatisfactory resistance to overloading.

DE 200 19 067 discloses a pressure-measuring device with a piezoresistive pressure sensor and hydraulic force transmission in which the process pressure of the measuring medium is transmitted to the pressure sensor by interposing a separating diaphragm with a fluid diaphragm seal, the process-pressure-dependent, diaphragm-seal-displacing deflection of the separating diaphragm being mechanically limited to an amount prescribably exceeding the measuring range, and the pressure sensor being arranged in the pressure-measuring device in such a way that it can move on a mechanically pretensioned overload diaphragm which, in dependence on process pressure exceeding the measuring range, limits a volumetrically variable equalizing space for accepting excess diaphragm seal.

This construction is complex and also characterized by a large number of joining processes between components subjected to pressure, which place extreme demands on the joint, in particular in the case of high limit pressures. Industrial applications of differential pressure sensors require overload resistance up to 400 bar.

DE 42 07 949 discloses a capacitive differential pressure sensor made using glass-silicon technology in which a plate of silicon, serving as a pressure-sensitive diaphragm and as a first electrode, is arranged between two carrier plates consisting of glass, the plate and the carrier plate being integrally connected to one another in their edge region by anodic bonding in such a way that in each case a carrier plate combines with the plate serving as the diaphragm to form a measuring chamber, each carrier plate has a pressure supply duct, which runs perpendicular to the contact surfaces of the plate and of the carrier plates and via which the respective measuring chamber can be pressurized, and the surfaces of the carrier plates lying opposite the deflectable region of the plate serving as the diaphragm are each provided with a metallization, serving as a second electrode, in such a way that the first electrode and the second electrodes form a differential-pressure-dependent capacitor arrangement.

The differential-pressure-dependent deformation of the plate serving as a diaphragm brings about a change in capacitance of the capacitor arrangement, the change in capacitance being a direct measure of the differential pressure. The change in capacitance is measured electrically. To allow a wide measuring range to be covered with adequate measuring accuracy, it is necessary for the deflectable region of the plate serving as a diaphragm to have a displacement which is at odds with designing the differential pressure sensor to be resistant to overloading. Industrial applications of differential pressure sensors demand overload resistance up to 400 bar.

In contrast thereto the differential pressure sensor of the present invention has high overload resistance in conjunction with high resolution at the beginning of the measuring range.

SUMMARY OF THE INVENTION

The invention proceeds from a known capacitive differential pressure sensor made using glass-silicon technology, in which a diaphragm plate of silicon, serving as a first electrode and with a pressure-sensitively deflectable region, is arranged between two carrier plates consisting of glass, the diaphragm plate and each carrier plate being integrally connected to one another in their edge region by anodic bonding in such a way that in each case a carrier plate combines with the diaphragm plate to form a measuring chamber, each carrier plate has a pressure supply duct, which runs perpendicular to the contact surfaces of the diaphragm plate and of the carrier plates and via which the respective measuring chamber can be pressurized, and the surfaces of the carrier plates lying opposite the deflectable region of the diaphragm plate are each provided with a metallization, serving as a second electrode, in such a way that the first electrode and the second electrodes form a differential-pressure-dependent capacitor arrangement.

The essence of the invention consists in that the diaphragm plate has for a prescribed measuring range within the same measuring chambers a plurality of mutually independent deflectable regions as measuring diaphragms for in each case a part-sensor with a part-measuring range, the overlapping of all the part-measuring ranges of the part-sensors being equal to the prescribed measuring range of the differential pressure sensor, the displacement of the measuring diaphragm of each part-sensor being mechanically limited outside its part-measuring range.

The measuring range of the differential pressure sensor is made up of the part-measuring ranges of the individual part-sensors. In this case, the high resolution in the part-measuring range of each part-sensor contributes to the resolution of the differential pressure sensor over the entire measuring range. In a corresponding way, the resolution at the beginning of the measuring range of the differential pressure sensor is determined by the resolution of the part-sensor with the part-measuring range for lowest differential pressures. The number of part-sensors is governed by the width of the measuring range of the differential pressure sensor and required resolution over the measuring range. With an increasing number of part-sensors, the measuring range of the differential pressure sensor is increased while the resolution remains the same and, within a prescribed measuring range of the differential pressure sensor, the resolution is increased.

Consequently and advantageously, a single differential pressure sensor is sufficient for a large number of different industrial applications. As a result, the expenditure in production and stockkeeping is reduced as a result of a smaller number of different individual parts and higher unit numbers of the single differential pressure sensor, this also being the case in service.

If the applied differential pressure exceeds the measuring range of a part-sensor by a prescribable amount, the measuring diaphragm of this part-sensor comes to bear against the nearest carrier plate. Consequently, the measuring diaphragm of this part-sensor is effectively protected from being damaged by overload.

According to a further feature of the invention, the part-measuring ranges are formed by part-sensors following one another in the measuring range and overlapping one another at the measuring range limits. In the measuring range limiting band produced as a result, the differential pressure is measured by two part-sensors of neighboring part-measuring ranges. It is obvious here that the two part-sensors must produce the same measured value for differential pressures in the measuring range limiting band of successive part-measuring ranges.

This partial redundancy advantageously achieves the effect of confirming measured values of the part-sensors for differential pressures in the measuring range limiting bands of successive part-measuring ranges.

According to a further feature of the invention, the various part-measuring ranges of the part-sensors are set by the rigidity of the measuring diaphragm, adapted to the respective part-measuring range. The dependence of the respective part-measuring range on the rigidity of the measuring diaphragm achieves the same maximum displacement for all the part-sensors of the differential pressure sensor.

Consequently, for overload protection, the mechanical displacement limitation for all the part-sensors of the differential pressure sensor is advantageously situated identically in one plane.

According to a refining feature of the invention, the rigidity of the measuring diaphragm is set by the diaphragm surface area. In this case, the diaphragm thickness of the measuring diaphragm is the same for all the part-sensors. With the same diaphragm thickness, measuring diaphragms with a smaller diaphragm surface area have a greater rigidity than measuring diaphragms with a larger diaphragm surface area. The measuring diaphragms of the part-sensors with part-measuring ranges designed for high differential pressures have a greater rigidity than the measuring diaphragms of the part-sensors with part-measuring ranges designed for low differential pressures.

In this case, all the measuring diaphragms are advantageously able to be formed during production by a single depth structuring process. With a diaphragm plate of silicon, it is advantageous to bring about the depth structuring by etching. In this case, the etching depth is proportional to the etching duration. With the same diaphragm thickness of the measuring diaphragm for all the part-sensors, all the measuring diaphragms are structured in a single etching process of the same duration for all the measuring diaphragms.

According to an alternative refining feature of the invention, the diaphragm thickness and the surface area of the measuring diaphragm are the same for all the part-sensors and each measuring diaphragm has reinforcing structures, in dependence on the respective part-measuring range.

This advantageously succeeds in accommodating a large number of part-sensors on a diaphragm plate of small surface area. This feature is particularly advantageous in the case of differential pressure sensors for a wide measuring range in conjunction with high resolution over the entire measuring range.

DESCRIPTION OF THE PREFERRED EMBODIMENT(S)

Figure 1:
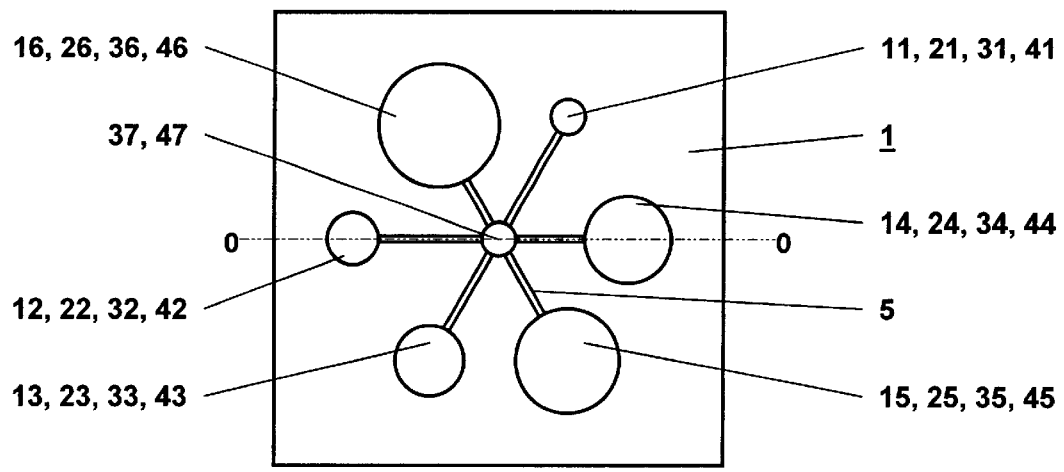
FIG. 1 shows a basic presentation of a differential pressure sensor of the present invention with a plurality of part sensors in a first embodiment.
Figure 2:
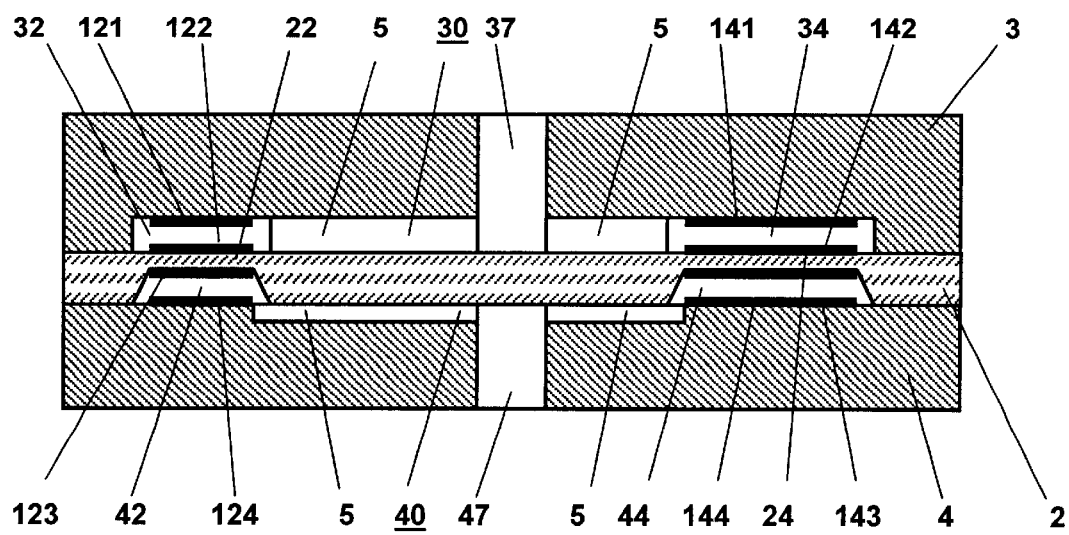
FIG. 2 shows a sectional representation along line 0—0 of FIG. 1.

In FIG. 1, the lateral construction of a differential pressure sensor 1 with six part-sensors 11 to 16 is represented in principle in a first embodiment. In FIG. 2, an enlarged sectional representation along the sectional line 0—0 in FIG. 1 is shown. Hereafter, reference is made simultaneously to FIGS. 1 and 2.

The differential pressure sensor 1 essentially comprises a diaphragm plate 2 of silicon, which is arranged between two carrier plates 3 and 4 consisting of glass, the diaphragm plate 2 and each carrier plate 3 and 4 being integrally connected to one another in their edge region by anodic bonding in such a way that in each case a carrier plate 3 and 4 combines with the diaphragm plate 2 to form a measuring chamber 30 and 40.

Each carrier plate 3, 4 has a central pressure supply duct 37, 47, which runs perpendicular to the plane of the contact surfaces of the diaphragm plate 2 and of the carrier plates 3, 4 and to which in each case six radially aligned capillaries 5 are connected. Each capillary 5 opens out into a sector 31 to 36 and 41 to 46. With reference to the plane of the diaphragm plate 2, a sector 31 to 36 adjoining the carrier plate 3 and a sector 41 to 46 adjoining the carrier plate 4 are respectively arranged congruently as a related pair of sectors 31/41 to 36/46.

In a corresponding way, the measuring chamber 30 limited by the carrier plate 3 is divided into six sectors 31 to 36 and six capillaries 5, connected to the pressure supply duct 37. The measuring chamber 40 limited by the carrier plate 4 is divided into six sectors 41 to 46 and six capillaries 5, connected to the pressure supply duct 47.

The diaphragm plate 2 is designed in the region of congruence of each pair of sectors 31/41 to 36/46 as a pressure-sensitively deflectable measuring diaphragm 21 to 26. A pair of sectors 31/41 to 36/46 and the associated measuring diaphragm 21 to 26 respectively form one of the six part-sensors 11 to 16.

The part-sensors 11 to 16 are distributed in a star-shaped manner in the differential pressure sensor 1. Each part-sensor 11 to 16 is assigned a total of four electrodes for sensing the pressure-dependent deflection of its measuring diaphragm 21 to 26. Represented in FIG. 2 for the part-sensors 12 and 14 are the associated electrodes 121 to 124 and 141 to 144, which are formed as thin metallization layers. For each part-sensor 12 and 14, one of the electrodes 121 and 141 is respectively attached to the carrier plate 3 and one of the electrodes 124 and 144 is respectively attached to the carrier plate 4. The electrodes 122 and 142 are arranged on the side of the measuring diaphragms 22 and 24 facing the carrier plate 3 and the electrodes 123 and 143 are arranged on the side of the measuring diaphragms 22 and 24 facing the carrier plate 4.

The pairs of electrodes 121/122, 123/124 and 141/142 and 143/144 arranged in the same sector 32, 42, 34 and 44 respectively form a capacitor, the capacitance ratio of the capacitors of the same part-sensor 12 and 14 being a measure of the difference between the pressures in the measuring chambers 30 and 40.

The capacitance ratios are evaluated separately by electronic means for each part-sensor 11 to 16. The measured values of the part-sensors 11 to 16 are checked for plausibility and combined to form a measured value for the differential pressure sensor 1.

The distance between the pairs of electrodes 121/122, 123/124 and 141/142 and 143/144 respectively forming a capacitor limits the differential-pressure-dependent displacement of the measuring diaphragms 21 to 26. In this case, the distance is made so small that still usable capacitance values of the capacitors are achieved with electrode surface areas of less than $\frac{1}{10}$ mm$^2$.

As soon as the difference in pressure exceeds the part-measuring range 101 to 106 of a part-sensor 11 to 16 for a sustained period, the adequate deflection of the associated measuring diaphragm 21 to 26 leads to the effect that, in the measuring chamber 30 or 40 of low pressure, the electrodes touch, initially at points and, as the difference in pressure increases, over their surface area. The small distance between the pairs of electrodes 121/122, 123/124 and 141/142 and 143/144 respectively forming a capacitor provides damage-free overload protection for each part-sensor 11 to 16.

The part-measuring ranges 101 to 106 of the part-sensors 11 to 16 are set by an adapted rigidity of the measuring diaphragms 21 to 26.

In the first embodiment, it is provided that the diaphragm thickness of the measuring diaphragms 21 to 26 is the same for all the part-sensors 11 to 16. With the same diaphragm thickness, measuring diaphragms 21, 22 and 23 with a smaller diaphragm surface area have a greater rigidity than measuring diaphragms 24, 25 and 26 with a larger diaphragm surface area. The measuring diaphragms 21, 22 and 23 of the part-sensors 11, 12 and 13 with part-measuring ranges 101, 102 and 103 designed for high differential pressures have a greater rigidity than the measuring diaphragms 24, 25 and 26 of the part-sensors 14, 15 and 16 with part-measuring ranges 104, 105 and 106 designed for low differential pressures.

In this case, all the measuring diaphragms 21 to 26 are advantageously able to be formed during production by a single depth structuring process. With a diaphragm plate 2 of silicon, it is advantageous to bring about the depth structuring by etching. In this case, the etching depth is proportional to the etching duration. The etching depth is limited by a resist layer. This resist layer expediently consists of silicon oxide. With the same diaphragm thickness of the measuring diaphragms 21 to 26 for all the part-sensors 11 to 16, all the measuring diaphragms 21 to 26 are structured in a single etching process of the same duration for all the measuring diaphragms 21 to 26.

Figure 7:
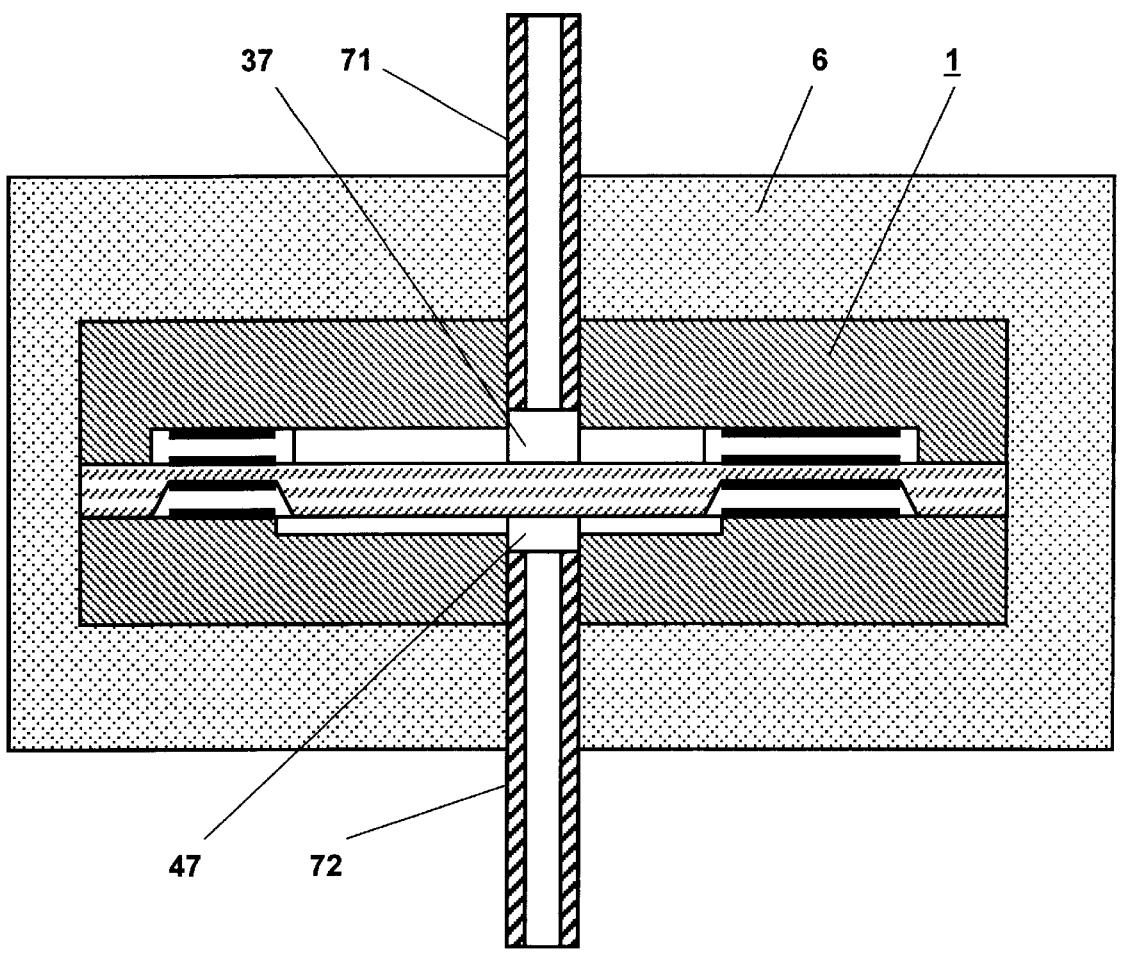
FIG. 7 shows the sensor of the present invention embedded in a casing.

The differential pressure sensor 1 is embedded as is shown in FIG. 7 in a pressure-resistant casing 6 of ceramic injection-molded material. The casing 6 encloses the differential pressure sensor 1 in one piece and comprises connection pieces 71, 72 for connecting the measuring mechanism to process-pressure lines. This advantageously avoids pressure-loaded joints in the measuring mechanism.

Figure 3:
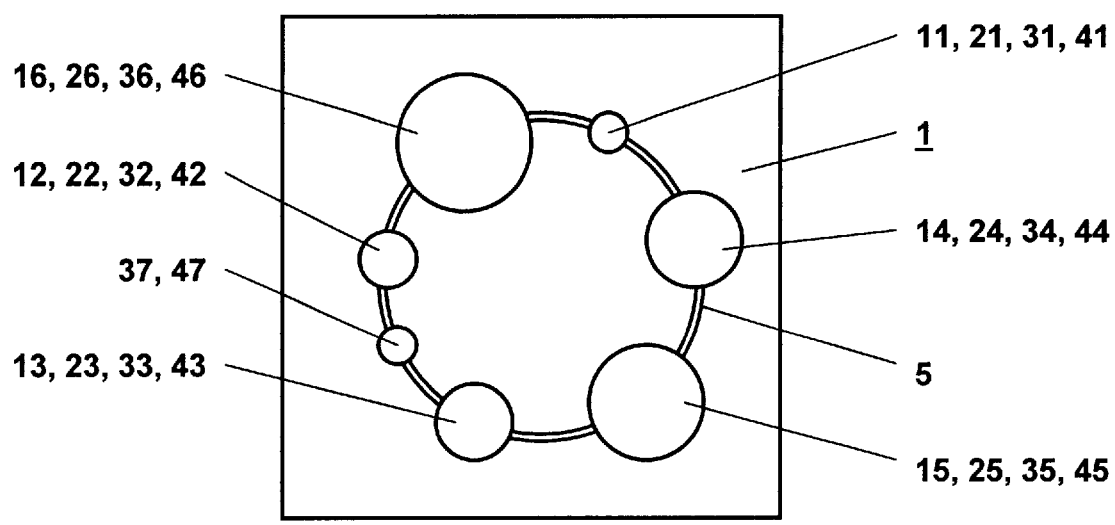
FIG. 3 shows a basic presentation of a differential pressure sensor of the present invention with a plurality of part sensors in a second embodiment.

Using the same reference numerals for the same means, a second embodiment of the invention is represented in FIG. 3. The differential pressure sensor 1 has six part-sensors 11 to 16, which are distributed in a circular manner in the differential pressure sensor 1, and a pressure supply duct 37 and 47 for each measuring chamber. Each part-sensor 11 to 16 is designed in the region of congruence of each pair of sectors 31/41 to 36/46 with a pressure-sensitively deflectable measuring diaphragm 21 to 26.

The pressure supply ducts 37 and 47 are eccentrically arranged and connected to the pairs of sectors 31/41 to 36/46 in each case via a capillary 5 designed as a ring line.

In a corresponding way, the measuring chamber 30 limited by the carrier plate 3 is divided into six sectors 31 to 36 and an annular capillary 5, connected to the pressure supply duct 37. The measuring chamber 40 limited by the carrier plate 4 is divided into six sectors 41 to 46 and an annular capillary 5, connected to the pressure supply duct 47.

The diaphragm thickness of the measuring diaphragms 21 to 26 is the same for all the part-sensors 11 to 16. With the same diaphragm thickness, measuring diaphragms 21, 22 and 23 with a smaller diaphragm surface area have a greater rigidity than measuring diaphragms 24, 25 and 26 with a larger diaphragm surface area. The measuring diaphragms 21, 22 and 23 of the part-sensors 11, 12 and 13 with part-measuring ranges 101, 102 and 103 designed for high differential pressures have a greater rigidity than the measuring diaphragms 24, 25 and 26 of the part-sensors 14, 15 and 16 with part-measuring ranges 104, 105 and 106 designed for low differential pressures.

Figure 4:
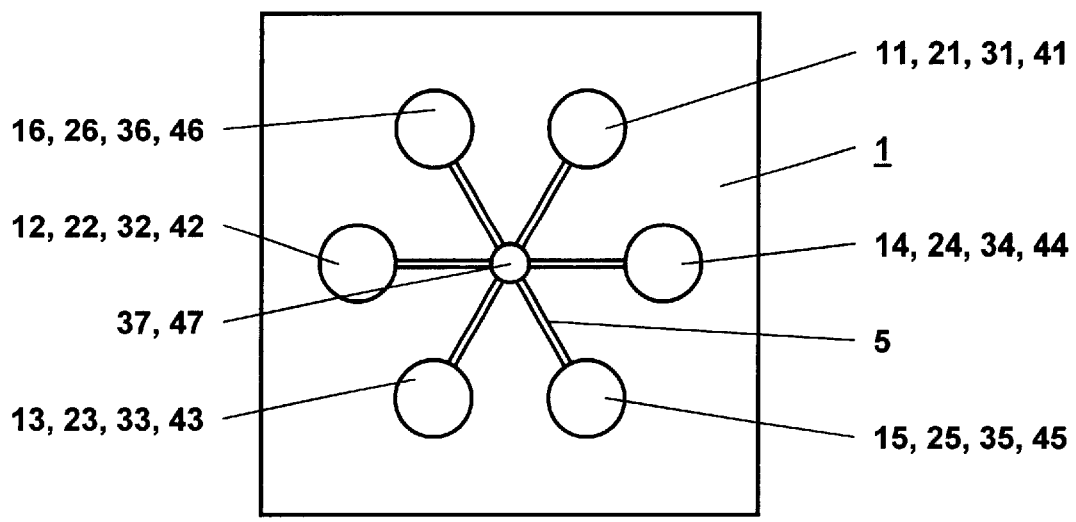
FIG. 4 shows a basic presentation of a differential pressure sensor of the present invention with a plurality of part sensors in a third embodiment.

Using the same reference numerals for the same means, a third embodiment of the invention is represented in FIG. 4. The differential pressure sensor 1 has six part-sensors 11 to 16, which are distributed in a circular manner in the differential pressure sensor 1, and a centrally arranged pressure supply duct 37 and 47 for each measuring chamber, to which duct six radially aligned capillaries 5 are respectively connected. Each capillary 5 opens out into a sector 31 to 36 and 41 to 46. Each part-sensor 11 to 16 is designed in the region of congruence of each pair of sectors 31/41 to 36/46 with a pressure-sensitively deflectable measuring diaphragm 21 to 26.

Figure 5:
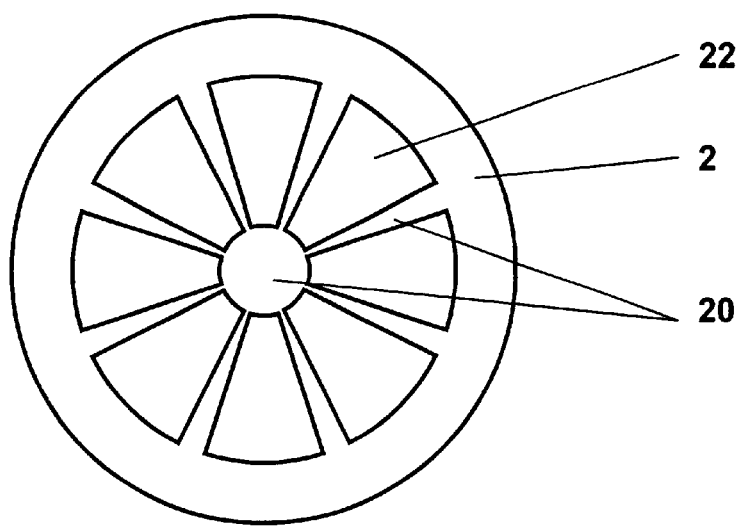
FIG. 5 shows a representation of a detail of a measuring diaphragm with reinforcing structures.

In this case, the diaphragm thickness and the surface area of the measuring diaphragm 21 to 26 are the same for all the part-sensors 11 to 16 and each measuring diaphragm 21 to 26 has reinforcing structures 20, in dependence on the respective part-measuring range 101 to 106, which are shown enlarged in FIG. 5 for the measuring diaphragm 22.

Starting from a prescribed material thickness of the diaphragm plate 2, the measuring diaphragms 21 to 26 are of lesser material thickness than the diaphragm plate 2 as a result of material removal. The reinforcing structures 20 are formed by partial material removal over the surface area of the measuring diaphragm 22. To be precise, a reinforcing structure 20 is formed by a central body of a greater material thickness arranged centrally in relation to the measuring diaphragm 22. The greater the proportion of the surface area of the measuring diaphragm 22 that is occupied by the central body, the greater the rigidity of the measuring diaphragm 22.

In addition, reinforcing structures 20 may be provided in the form of radial webs. The rigidity of the measuring diaphragm 22 increases with increasing height and width of the webs.

For measuring diaphragms 21, 22 and 23 of the part-sensors 11, 12 and 13 with part-measuring ranges designed for high differential pressures it is advantageous to form the reinforcing structures 20 in the form of a combination of a central body and radial webs.

Figure 6:
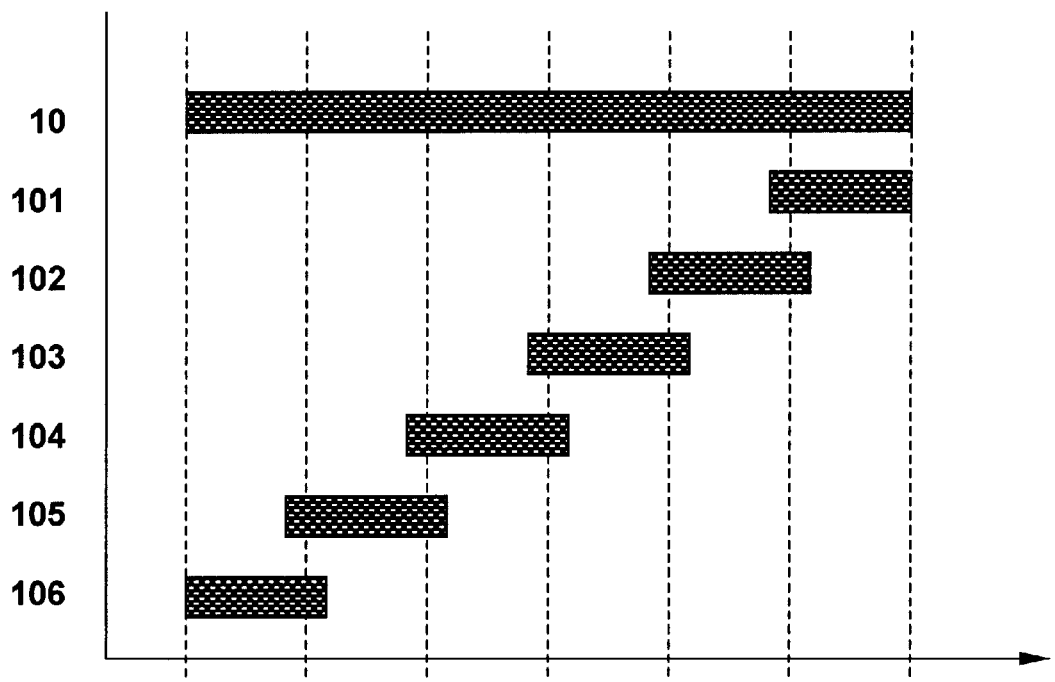
FIG. 6 shows a graphic representation of the measuring range of the differential pressure sensor of the present invention and its part sensors.

Each part-sensor 11 to 16 is designed for measurement in a part-measuring range 101 to 106. In FIG. 6, the part-measuring ranges 101 to 106 of the part-sensors 11 to 16 and the measuring range 10 of the differential pressure sensor 1 are graphically represented. The overlapping of all the part-measuring ranges 101 to 106 produces the measuring range 10 of the differential pressure sensor 1. In this case, the part-measuring ranges 101 to 106 are formed by part-sensors 11 to 16 following one another in the measuring range and overlapping one another at the measuring range limits. In the measuring range limiting band produced as a result, the differential pressure is measured by two part-sensors 11/12 to 15/16 of neighboring part-measuring ranges 101/102 to 105/106. It is obvious here that the two part-sensors 11/12 to 15/16 must produce the same measured value for differential pressures in the measuring range limiting band of successive part-measuring ranges 101/102 to 105/106.

To validate measured values, it may be expedient to cover the part-measuring range 106 of the part-sensor 16 for lowest differential pressures completely by the next-higher part-measuring range 105 of the part-sensor 15. In addition, it may be expedient to duplicate the part-sensor 11 with the part-measuring range 101 for highest differential pressures.

It is to be understood that the description of the preferred embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A capacitive differential pressure sensor comprising:
   a. two glass carrier plates; and
   b. a diaphragm plate of silicon serving as a first electrode and with a pressure-sensitively deflectable region arranged between said two carrier plates;
   said diaphragm plate and each carrier plate being integrally connected to one another in their edge region by anodic bonding such that each of said two carrier plates combine with said diaphragm plate to form a measuring chamber, each of said carrier plates having a pressure supply duct, which runs perpendicular to the contact surfaces of said diaphragm plate and of said carrier plates and through which the respective measuring chamber can be pressurized, the surfaces of said carrier plates lying adjacent said deflectable region of said diaphragm plate forming a first electrode and said surfaces of said carrier plates lying opposite the deflectable region of the diaphragm plate are each provided with a metallization, serving as a second electrode, in such a way that the first electrode and the second electrodes form a differential-pressure-dependent capacitor arrangement
   said diaphragm plate having for a prescribed measuring range within the same measuring chambers a plurality of mutually independent deflectable regions as measuring diaphragms for in each case a part-sensor with a part-measuring range,
   the overlapping of all the part-measuring ranges of the part-sensors being equal to the prescribed measuring range of the differential pressure sensor, and
   the displacement of the measuring diaphragms of each part-sensor is mechanically limited outside its part-measuring range.

2. The differential pressure sensor of claim 1 wherein said part-measuring ranges are formed by said part-sensors following one another in said measuring range and overlapping one another at the limits of said measuring range.

3. The differential pressure sensor of claim 1 wherein said part-measuring ranges of said part-sensors are set by the rigidity of said associated measuring diaphragms adapted to said part-measuring range.

4. The differential pressure sensor of claim 1 wherein said part-measuring ranges of said part-sensors are set by the rigidity of said associated measuring diaphragms adapted to said part-measuring range.

5. The differential pressure sensor as claimed in claim 3, wherein the diaphragm thickness of the measuring diaphragm is the same for all the part-sensors and the surface area of each measuring diaphragm is set in dependence on the respective part-measuring range.

6. The differential pressure sensor as claimed in claim 4, wherein the diaphragm thickness of the measuring diaphragm is the same for all the part-sensors and the surface area of each measuring diaphragm is set in dependence on the respective part-measuring range.

7. The differential pressure sensor as claimed in claim 3, wherein the diaphragm thickness and the surface area of the measuring diaphragm are the same for all the part-sensors and each measuring diaphragm has reinforcing structures, in dependence on the respective part-measuring range.

8. The differential pressure sensor as claimed in claim 4, wherein the diaphragm thickness and the surface area of the measuring diaphragm are the same for all the part-sensors and each measuring diaphragm has reinforcing structures, in dependence on the respective part-measuring range.

9. The differential pressure sensor as claimed in one of claim 1, wherein the part-sensor with the highest part-measuring range is duplicated.

10. The differential pressure sensor as claimed in one of claim 2, wherein the part-sensor with the highest part-measuring range is duplicated.

11. The differential pressure sensor as claimed in one of claim 3, wherein the part-sensor with the highest part-measuring range is duplicated.

12. The differential pressure sensor as claimed in one of claim 4, wherein the part-sensor with the highest part-measuring range is duplicated.

13. The differential pressure sensor as claimed in one of claim 1, wherein the measuring chambers are divided into sectors which are hydropneumatically connected to one another, a part-sensor being arranged in each pair of sectors.

14. The differential pressure sensor as claimed in one of claim 12 wherein the measuring chambers are divided into sectors which are hydropneumatically connected to one another, a part-sensor being arranged in each pair of sectors.

15. The differential pressure sensor as claimed in one of claim 3, wherein the measuring chambers are divided into sectors which are hydropneumatically connected to one another, a part-sensor being arranged in each pair of sectors.

16. The differential pressure sensor as claimed in one of claim 4, wherein the measuring chambers are divided into sectors which are hydropneumatically connected to one another, a part-sensor being arranged in each pair of sectors.

17. The differential pressure sensor as claimed in claim 13, wherein the sectors of a measuring chamber are hydropneumatically connected to one another in a star-shaped manner, starting from the pressure supply duct.

18. The differential pressure sensor as claimed in claim 14, wherein the sectors of a measuring chamber are hydropneumatically connected to one another in a star-shaped manner, starting from the pressure supply duct.

19. The differential pressure sensor as claimed in claim 15, wherein the sectors of a measuring chamber are hydropneumatically connected to one another in a star-shaped manner, starting from the pressure supply duct.

20. The differential pressure sensor as claimed in claim 16, wherein the sectors of a measuring chamber are hydropneumatically connected to one another in a star-shaped manner, starting from the pressure supply duct.

21. The differential pressure sensor as claimed in claim 13, wherein the sectors of a measuring chamber are hydropneumatically connected to one another in a ring-shaped manner with the inclusion of the pressure supply duct.

22. The differential pressure sensor as claimed in claim 14, wherein the sectors of a measuring chamber are hydropneumatically connected to one another in a ring-shaped manner with the inclusion of the pressure supply duct.

23. The differential pressure sensor as claimed in claim 15, wherein the sectors of a measuring chamber are hydropneumatically connected to one another in a ring-shaped manner with the inclusion of the pressure supply duct.

24. The differential pressure sensor as claimed in claim 16, wherein the sectors of a measuring chamber are hydropneumatically connected to one another in a ring-shaped manner with the inclusion of the pressure supply duct.

25. The differential pressure as claimed in claim 1, wherein said sensor is embedded in a pressure-resistant casing of ceramic injection-molded material.

26. The differential pressure as claimed in claim 2, wherein said sensor is embedded in a pressure-resistant casing of ceramic injection-molded material.

27. The differential pressure as claimed in claim 3, wherein said sensor is embedded in a pressure-resistant casing of ceramic injection-molded material.

28. The differential pressure as claimed in claim 4, wherein said sensor is embedded in a pressure-resistant casing of ceramic injection-molded material.

* * * * *